(12) United States Patent
Rolland

(10) Patent No.: US 6,321,506 B1
(45) Date of Patent: Nov. 27, 2001

(54) COFFEE DISPENSING AND PACKAGING MACHINE

(76) Inventor: Guy Rolland, 30 Boulevard Louis Millet, 44000 Nantes (FR)

( * ) Notice: Subject to any disclaimer, the term of this patent is extended or adjusted under 35 U.S.C. 154(b) by 0 days.

(21) Appl. No.: 09/478,554

(22) Filed: Jan. 6, 2000

(30) Foreign Application Priority Data

Jul. 13, 1999 (IL) ............................................. PN99A0057

(51) Int. Cl.[7] .................................................. B65B 57/00
(52) U.S. Cl. ................................................ 53/53; 53/58
(58) Field of Search .................................. 53/58, 57, 493, 53/548, 551, 247, 248, 248.7, 502, 503; 141/10, 114, 83, 313, 314, 315, 316

(56) References Cited

U.S. PATENT DOCUMENTS

| | | | |
|---|---|---|---|
| 2,144,569 | * | 1/1939 | Frazier .................................. 141/313 |
| 2,317,865 | * | 4/1943 | Talbot .................................. 141/315 |
| 4,971,259 | * | 11/1990 | Nidiffer .................................. 241/34 |
| 5,353,847 | * | 10/1994 | Cahlander et al. .................... 141/83 |
| 5,458,295 | * | 10/1995 | Haber et al. .......................... 241/100 |
| 5,532,011 | * | 7/1996 | Goglio .................................. 426/316 |
| 5,603,458 | * | 2/1997 | Sandolo .................................. 241/34 |

* cited by examiner

Primary Examiner—Allan N. Shoap
Assistant Examiner—Nathaniel Chukwurah
(74) Attorney, Agent, or Firm—Bucknam and Archer

(57) ABSTRACT

Coffee dispensing and packaging machine, comprising a container for the grained coffee and a mill for the same coffee, in which the container (7) is subdivided in a plurality of separate rooms (8, 9) containing respectively grained coffee of different types, and is joined at the lower side thereof with at least an additional container (21), subdivided in first and second room portions (28, 29; 30, 31), respectively utilized for metering the grained coffee and grinding thereof. Such first and second room portions (28, 29; 30, 31) are provided with movable gates (24, 25, 26, 27) for metering and grinding the grained coffee and a discharge conduit (41) of the ground coffee. Machine comprising also a plurality of bags (42) in which the ground coffee is introduced.

12 Claims, 2 Drawing Sheets

COFFEE DISPENSING AND PACKAGING MACHINE

BACKGROUND OF THE INVENTION

The invention relates to a coffee dispensing and packaging machine, shaped for permitting the introduction therein of grained coffee of different types and quantities and subsequently the grinding of such grained coffee and the packaging thereof into particular flexibles bags made of suitable material. At the present time, the coffe-based beverages in case mixed with milk or other components are prepared by utilizing commonly either grained coffee of different kinds, which is ground as a powder and introduced into the conventional coffee making machines, or coffee which is pre-ground and packaged at different quantities thereof into suitably sealed flexible bags, which are sold to the public and subsequently opened for introducing coffee powder into said coffee making machines.

SUMMARY OF THE INVENTION

The present invention has the scope to make available the coffee in a manner different than those described above, by means of a coffee dispensing and packaging machine permitting the desired kind and quantity of coffee to be selected and packaged automatically into particular flexible bags, for the subsequent use of the same coffee into the commonly employed coffee making machines. This machine for dispensing and packaging automatically the coffee is made with the constructive characteristics substantially described, with particular reference to the attached claims of the present patent.

BRIEF DESCRIPTION OF THE DRAWINGS

The invention will be better understood from the following description, given by way of a not-limitative example only and with reference to the accompanying drawings, wherein.

DETAILED DESCRIPTION OF THE INVENTION

Figure 1:
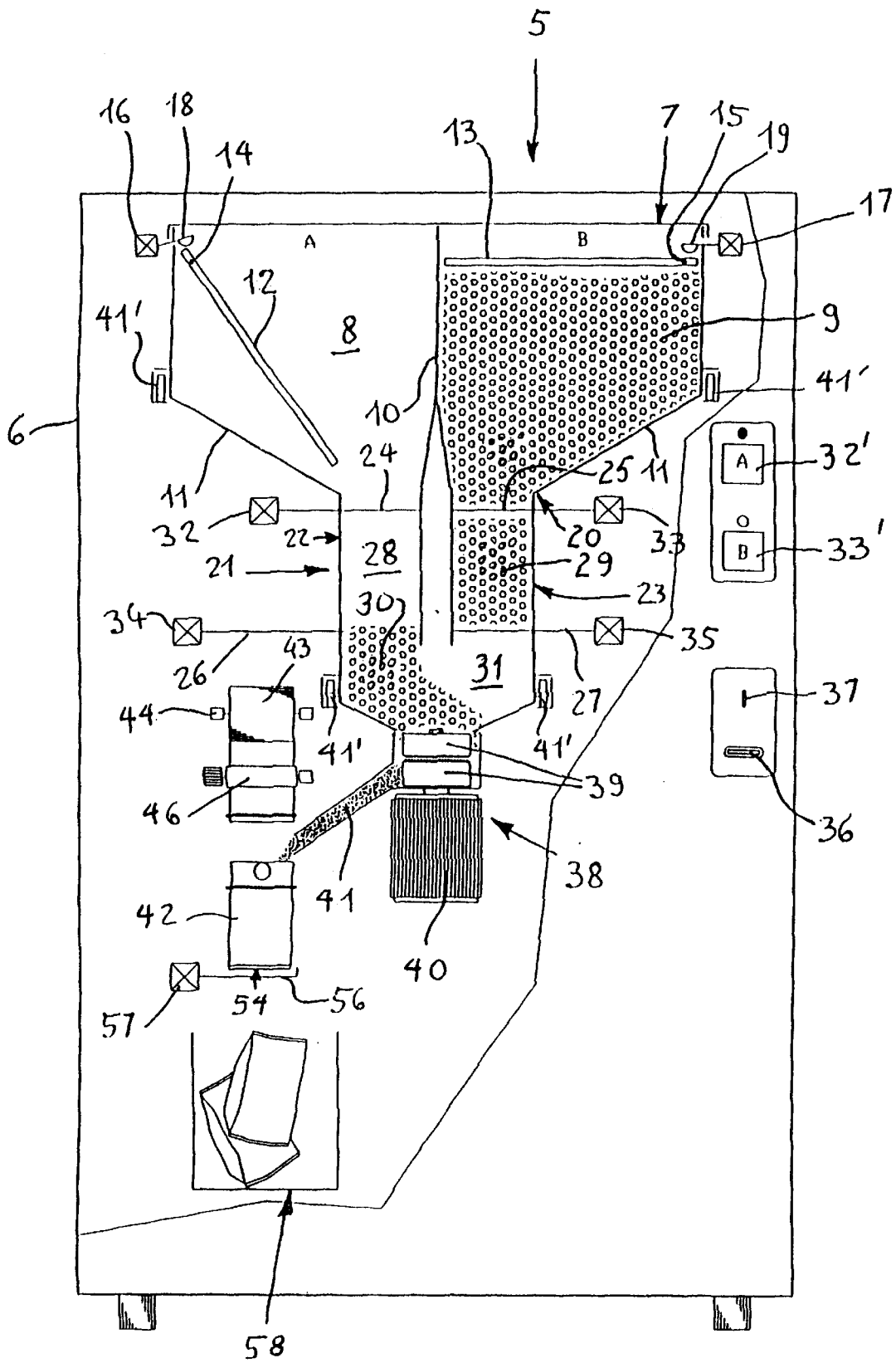
FIG. 1 shows a schematic front view of a coffee dispensing and packaging machine according to the invention.

The above Figures represent schematically a machine 5 for dispensing and packaging automatically the coffee in accordance to the invention, in which the grained coffee of different kinds and quantities is introduced, which can be selected at will from the user, and such grained coffee is automatically ground and packaged into particular flexible bags or similar containers made of adequate material, which after having been filled are suitably sealed and made available for the use thereof. Such machine 5 substantially comprises a vertical extended cabinet 6 containing at least a container 7 for the grained coffee, arranged on the machine upper part and open at its upper and lower side, such container being subdivided into separate rooms in the present example formed by the rooms 8 and 9, by means of intermediate partition walls (in the represented example formed by the single wall 10), which rooms have an adequate volume for containing considerable quantities of different kinds of grained coffee which is introduced in the same rooms through the open upper part thereof. Of course, the container may be subdivided also on a different number of separate rooms with respect to the just described rooms. Advantageously, the container 7 is shaped of parallelepiped form tapered downwards, the lower walls 11 of which are inclined downwards so as to make easier the fall of grained coffee toward the lower part of the same container, however this container can be shaped also with forms different than that described.

Each one of the separate rooms 8 and 9 is provided with a suitable sensor detecting the filling conditions of the grained coffee into the same room, and in the present example such sensor is constituted by a corresponding rectilinear flat wall 12 and 13 housed in the associated room and made of a size slightly smaller with respect to the size of the same room, and such flat walls are hinged at the relative end portions 14 and 15 thereof on the upper part of the respective room, in a way to be able to move under gravity from an upper position (marked with the letter B in the FIG. 1), in which each wall arranges itself almost horizontally, at the highest filling level condition of the grained coffee, to a lower position (marked with the letter A in the FIG. 1), in which each wall is completely inclined downwards, at the fully emptying condition of the grained coffee from the respective room. Such end portions 14 and 15 of the flat walls are associated to a corresponding electric switch 16 and 17, connected operatively in the machine electric circuit and during the displacement of each flat walls 12 and 13 from the upper to the lower position and vice versa they operate the respective electric contact (not shown) of the same switches into different operative positions thereof, through a respective movable arm 18 and 19 connected to said electric contacts, which consequently cause the machine electric circuit to be switched on at the complete or partially filled condition of the grained coffee in the rooms, or switched off at the emptied condition of the rooms, in which the grained coffee is completely fallen downwards from the related room.

The lower part 20 of the container 7 is joined to an additional container 21 below it, having a form and size corresponding to the same lower part, said additional container 21 being subdivided into separate rooms tapered downwards and communicating with the separate rooms of the preceding container 7, in the present case being subdivided into the rooms 22 and 23 communicating with the rooms 8 and 9 above them, in a way that the grained coffee coming from the rooms 8 and 9 collects itself in the respective rooms 22 and 23, in order to be subsequently ground as it will be described hereinafter. As it can be particularly seen from the FIG. 1, each one of the rooms 22 and 23 is associated respectively to at least a first flat rectilinear movable gate 24 and 25, situated on the upper position of the relative room, below the lower part 20 of the container 7, and at least a respective second flat rectilinear movable gate 26 and 27, situated below the corresponding first movable gate 24 and 25 and almost at the intermediate position of the relative room, so as to delimit respectively a first room portion 28 and 29, which is used for metering the respectively selected quantities of grained coffee, and a second room portion 30 and 31 for grinding each selected quantity of coffee.

Such first and second movable gates 24, 25 and 26, 27 are made with a size slightly smaller than that of the corresponding rooms and are also joined to suitable control means, in the present case constituted respectively by the electromagnets 32, 33 and 34, 35 connected in the machine electric circuit, in such a manner that to be moved slidably from an extended position thereof in which each movable gate enters completely the corresponding room, by determining the closing thereof, to a retracted position thereof in which each movable gate is completely extracted from the corresponding room, by determining the opening thereof.

In this way, by operating the different gates in either one or other of the operative positions thereof, it is possible to introduce the grained coffee from each separate room initially in the first room portion 28 or 29 below it and subsequently from this latter in the second room portion 30 or 31 below it. In particular, the grained coffee is introduced from each separate room in the corresponding first room portion below it by maintaining the second movable gate 26 or 27 on the closed position thereof and by operating the relative first movable gate 24 or 25 on the opened position thereof, for a period of time sufficient to fill each room portion with the respectively desired quantity of grained coffee, and at the end of such period of time by operating again the relative first movable gate on the closed position thereof In this case, the coffee which is introduced in the respective first room portion is metered by utilizing timer means of per se known kind, connected in the machine electric circuit and acting on the different electromagnets 32, 33 and 34, 35 which operate said movable gates.

Moreover, this metering operation may be effected also in different manners, for example by using weight sensors of conventional kind (not shown), arranged in the interior of the first room portions 28 or 29 and connected in the machine electric circuit, and set for detecting the weight of the grained coffee introduced in the same room portions.

In this way, the coffee metering is selected in advance by acting on suitable control push-buttons for the machine operative cycles, which are connected in the machine electric circuit and associated to the different kinds of sensors for determining the same metering, which are constituted for example by the push-buttons 32' or 33' of selection of two different types of grained coffee and control running of the relative selected cycles.

Of course, the selection of the metering operation and the relative cycles to be performed may be effected also with control means of different type, such as for instance by means of a magnetic card (not shown) in which all the operative cycles and the desired meterings and types of coffee, which are selected by acting on suitable control push-buttons, are stored in advance, which card is inserted through a corresponding machine front opening 36, upon introduction of a possible coin which operates the cycle starting (not shown), through a corresponding further machine front opening 37.

This solution lends itself particularly for the use on machines in the form of automatic dispensers performing the same functions as described above.

In turn, the introduction of the metered quantity of grained coffee from the first room portions 28 or 29 in the second room portions 30 or 31 below them, which are communicating with each other, is effected by keeping the relative first movable gates 24 or 25 closed and operating the relative second movable gate 26 or 27 on the opened position thereof, and, as soon as each first room portion has been emptied, by operating again such second movable gates on the closed position thereof, so as to set such first room portions for being filled subsequently with metered quantities of grained coffee in the same manners as described above.

At least a grinding mill 38 is attached on the lower part of the second room portions 30 and 31, which is provided with rotors 39 for grinding the grained coffee and entering in the interior of said room portions, and are operated in rotation by an electric motor 40 below it, which projects externally from the same room portions.

Such second room portions 30 and 31 are provided at the lower side thereof with an inclined conduit 41 for discharging the ground coffee downwards and packaging it in the manner hereinafter described. Advantageously, the assembly formed by the container 7 and the first and second room portions is assembled removably with respect to the mill 38, and therefore can be disassembled from this latter for cleaning operations thereof in which the coffee powder, which has been collected against the inner walls of the container, the room portions and the same mill, is removed, which operations are normally effected manually when the machine is not operating and after a certain number of cycles which have been performed. In the example referred to, such assembly is provided with wheels 41' arranged slidable into side rectilinear guide elements 41" of the machine cabinet, in order to allow the same assembly to be disassembled therefrom.

Furthermore, the present machine comprises a plurality of flexible bags 42 made of adequate material, into which the ground coffee is introduced as it will be described, which bags are joined reciprocally in the form of a continuous band 43, rolled up around an idle rotating shaft 44 situated at a position above and coinciding with respect to the inclined discharging conduit 41, which band is entrained by at least two powered rotating rollers 45 and 46 into close contact arrangement to the two larger surfaces of the same bag, so that this latter is moved slowly downwards, in a manner to be positioned firstly at the level of a sealing device 47 arranged below it, formed for example by a spot welding machine or a seaming machine or similar means, of conventional type, which provides for sealing tightly the bottom of each bag, and thereafter at the level of a device 48 for stopping temporarily each bag, in order to permit the ground coffee to be filled therein, as well as of another sealing device 49 of the same kind of the described above one, which provides for sealing tightly the upper part of each bag as soon as it has been filled.

Figure 2:
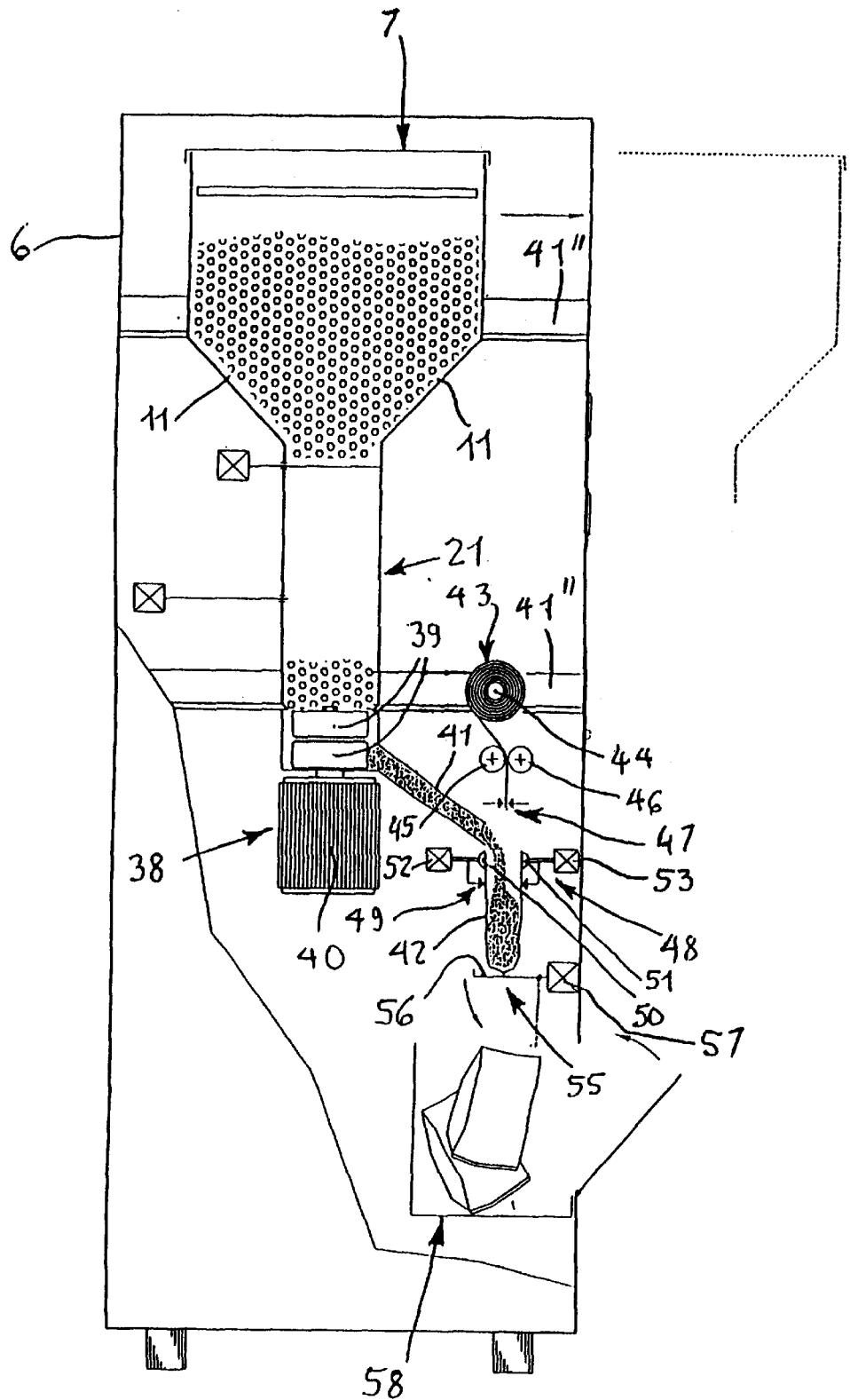
FIG. 2 shows a schematic side view of the machine of FIG. 1.

In particular, the temporarily stopping device 48 is constituted by at least two pressing elements 50 and 51, situated along the bag moving path and below the mouth of the inclined discharging conduit 41 and operated by respective control means 52 and 53 (in the illustrated example, formed by electromagnets connected in the machine electric circuit), at the same time from a retracted position thereof (visible in the FIG. 2) in which the pressing elements 50 and 51 are moved away from each other, to an extracted position thereof in which the two pressing elements are approached to each other.

Then, in the first case each bag 42 entrained by the powered rollers 45 and 46 is passed slowly in the space comprised between the pressing elements 50 and 51, in a manner that such pressing elements arrange themselves against a respective larger surface of each bag, and the bag is entrained up to its sealed bottom 54 rests on a support surface 55 below it, which surface is formed for example by a movable bracket 56 articulated in the machine and actuated by adequate control mechanisms (in the example, by an electromagnet 57), and in this position the rotating rollers 45 and 46 and the bag are stopped, so as to permit the introduction of the ground coffee in the open upper part of the same bag, until this bag is filled with the entire dose of ground coffee which has been prepared. On the contrary, in the second case the pressing elements are moved in an approached position thereof, at the end of filling each bag, in which a further dispensing of coffee through the inclined discharging conduit 41 is prevented, and in this position the two larger surfaces of each bag are mated to each other, in order to be subsequently sealed tightly by the sealing device 49. Then, in this condition the so packaged bag is let to fall downwards, by collecting itself on a receptacle 58 of the machine below it, and this operation is produced by displacing the movable bracket 56 from the preceding closing position thereof in which the bag was supported by the same, to an open position thereof in which such bracket is moved away from the bag thereby letting the same bag to fall.

Thus, it appears evident that the present machine permits the selection of the type and doses of coffee and the automatic carrying out of all the operations involved for grinding and packaging the coffee into containers, in order to use the same coffee in the commonly employed coffee making machines.

Besides, it is to point out that the machine may be made also with constructive component parts that are different than those described by way of example only, provided that the coffee dispensing and packaging operations are always performed with the same specified operative steps, thus without departing from the protection field of the present invention.

What is claimed is:

1. Coffee dispensing and packaging machine, comprising:
at least a container for the grained coffee, disposed on the upper part of the machine and open at the upper and lower part thereof and shaped with a parallel piped form tapered downwards, the lower walls of which are inclined downwards, said container being subdivided in a plurality of separate rooms containing respectively grained coffee of different types and being joined at the lower side of its lower walls to at least an additional container, said additional container being sub-divided in first and second room portions, respectively utilized for metering the grained coffee and grinding thereof, said first room portions communicating at the upper side thereof with said respective separate rooms through first movable control means and at the lower side thereof with said second room portions through second movable control means, said second room portions containing coffee grinding means, and wherein a plurality of bags for the ground coffee joined reciprocally in the form of a continuous band and entrained by powered means in such a way as to be moved initially towards first sealing means, in which the bottom of each bag is sealed tightly, then towards temporarily stopping means at a position coinciding with a discharge conduit provided on said second room portions, in which each bag is temporarily stopped and filled with a dose of ground coffee, said bag being sealed at the upper part thereof by second sealing means at the end of the filling operation and being finally displaced towards collecting means, wherein each one of said separate rooms is provided with sensor means detecting the filling and emptying conditions of grained coffee with respect to the same rooms, said sensor means co-operating with respective switch means in such a way as to permit or prevent the machine operation respectively on the filling or emptying condition thereof.

2. Coffee dispensing and packaging machine according to claim 1, wherein said sensor means comprise at least a corresponding flat rectilinear wall housed on the relative room and made with a size slightly smaller with respect to the size of the same room, said flat walls being hinged at the corresponding end portions thereof on the upper part of the relative room and being movable under gravity from an upper position thereof in which each wall arranges itself almost horizontally, at the highest filling condition of the coffee, to a lower position thereof in which each wall is completely inclined downwards, at the fully emptying condition of the respective room.

3. Coffee dispensing and packaging machine according to claim 1, wherein said first and second movable control means comprise respective first movable gates and second movable gates, made of a size slightly smaller than that of the corresponding rooms and joined to corresponding electromagnet means connected in the machine electric circuit, said first movable gates and said second movable gates being operable from a closing to an open position thereof, in which all the rooms are not communicating or are communicating with each other, in such a way that the grained coffee may be introduced from the respective separate rooms into the corresponding first room portions, by maintaining closed said second movable gates and operating said first movable gates into the open position thereof, and that such grained coffee may be introduced from said first room portions on metered quantities thereof into the corresponding second room portions, by maintaining closed said first movable gates and operating said second movable gates into the open position thereof.

4. Coffee dispensing and packaging machine according to claim 3, wherein timer means are provided for metering coffee quantities, said timer means being connected in the machine electric circuit and to said control means, in a manner to cause the relative movable gate to be closed after a period of time sufficient to fill each room portion with the quantity of grained coffee respectively desired.

5. Coffee dispensing and packaging machine according to claim 3, wherein weight sensors of conventional type are provided for metering coffee quantities, said weight sensors being connected in the machine electric circuit and set for detecting the weight of the grained coffee introduced into said first room portions.

6. Coffee dispensing and packaging machine according to claim 1, wherein said container and said first and second room portions are assembled removably on said grinding means, so as to be able to be disassembled from this latter for cleaning thereof.

7. Coffee dispensing and packaging machine according to claim 1, which comprises weight sensors connected in the machine electric circuit and set for detecting the weight of the grained coffee introduced into the first room portions for determining the metering and the different types of grained coffee and controlling the carrying out of the respectively selected cycles.

8. Coffee dispensing and packaging machine according to claim 1, wherein said bags are joined reciprocally in the form of a continuous band rolled up around an idle rotating shaft situated in a position above and coinciding with respect to said discharge conduit.

9. Coffee dispensing and packaging machine according to claim 8, wherein said powered means comprise two powered rotating rollers into close contact arrangement to the two larger surfaces of said bags in a way to cause the progressive displacement thereof.

10. Coffee dispensing and packaging machine according to claim 1, wherein said first and second sealing means comprise a spot welding machine or a seaming machine.

11. Coffee dispensing and packaging machine according to claim 1, wherein said temporarily stopping means comprise at least two pressing elements situated along the displacement path of said bags and below the mouth of said discharge conduit, as well as operated by electromagnetic control means connected in the machine electric circuit, at the same time from a retracted position thereof in which said pressing elements are moved away from each other, so as to allow each bag to pass and to be positioned on its filling position therethrough, to an extracted position thereof in which said pressing elements are approached to each other for sealing the upper part of the same bag.

12. Coffee dispensing and packaging machine according to claim 11, which further comprises at least a support surface to support each bag during filling thereof, and to let the filled bag to arrive into said collecting means.

* * * * *